US010248216B2

(12) United States Patent
Liu

(10) Patent No.: US 10,248,216 B2
(45) Date of Patent: Apr. 2, 2019

(54) METHOD FOR OPERATING TERMINAL DEVICE WITH GESTURE AND DEVICE

(71) Applicant: TENCENT TECHNOLOGY (SHENZHEN) COMPANY LIMITED, Shenzhen (CN)

(72) Inventor: Jian Liu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 332 days.

(21) Appl. No.: 14/615,840

(22) Filed: Feb. 6, 2015

(65) Prior Publication Data

US 2015/0153836 A1 Jun. 4, 2015

Related U.S. Application Data

(63) Continuation of application No. PCT/CN2013/079527, filed on Jul. 17, 2013.

(30) Foreign Application Priority Data

Aug. 9, 2012 (CN) .......................... 2012 1 0282552

(51) Int. Cl.
*G06F 3/01* (2006.01)
*G06F 3/03* (2006.01)
*G06K 9/00* (2006.01)

(52) U.S. Cl.
CPC ............ *G06F 3/017* (2013.01); *G06F 3/0304* (2013.01); *G06K 9/00355* (2013.01)

(58) Field of Classification Search
CPC . G06F 3/017; G06F 3/01; G06F 3/011; G06F 3/014; G06F 3/0304; G06F 3/0325;
(Continued)

(56) References Cited

U.S. PATENT DOCUMENTS

2005/0036659 A1* 2/2005 Talmon .................... G06K 9/00
382/103
2007/0118820 A1* 5/2007 Hatakeyama ......... G06F 3/0304
715/863
(Continued)

FOREIGN PATENT DOCUMENTS

CN 101840275 A 9/2010
CN 102156859 A 8/2011
(Continued)

OTHER PUBLICATIONS

International Preliminary Report and Written Opinion of the International Searching Authority for International Application No. PCT/CN2013/079527, dated Feb. 19, 2015, in 5 pages.
(Continued)

*Primary Examiner* — Nathan Danielsen
(74) *Attorney, Agent, or Firm* — Knobbe Martens Olson & Bear LLP

(57) ABSTRACT

A method for operation a terminal device with gesture and a device are provided. The method includes obtaining a gesture video segment comprising a preset number of frames of images, obtaining gesture track information of a user according to a location of a finger of the user in each frame of image of the gesture video segment, searching in a preset corresponding relationship between the gesture track information and an operation according to the gesture track information, obtaining the operation corresponding to the gesture track information of the user and performing the operation. With the technical scheme of the present disclosure, the gesture track information of the user is obtained via analyzing each frame of image in the obtained gesture video segment. The gesture track information of the user in a dimensional plane is concerned and the corresponding operation thereof is obtained via the gesture track information. This technical scheme may enrich the methods for
(Continued)

triggering the operation, operate the terminal device without directly touching the terminal device and reduce the dependence on the peripheral devices, such as the mouse and the keyboard.

6 Claims, 5 Drawing Sheets

(58) Field of Classification Search
CPC .......... G06F 3/033; G06F 3/038; G06F 3/042; G06F 3/048; G06F 3/0487; G06F 3/04886; G06F 3/05; G06F 2203/0331; G06K 9/00; G06K 9/00335–9/00355
See application file for complete search history.

(56) References Cited

U.S. PATENT DOCUMENTS

| | | | | |
|---|---|---|---|---|
| 2007/0236366 | A1* | 10/2007 | Gur | G06K 9/00 340/945 |
| 2008/0273755 | A1* | 11/2008 | Hildreth | G06F 3/017 382/103 |
| 2011/0016405 | A1* | 1/2011 | Grob | H04N 1/00127 715/740 |
| 2011/0170745 | A1* | 7/2011 | Chen | G06F 3/017 382/103 |
| 2013/0182898 | A1* | 7/2013 | Maeda | G06F 3/017 382/103 |
| 2013/0342671 | A1* | 12/2013 | Hummel | G06F 3/017 348/77 |

FOREIGN PATENT DOCUMENTS

| | | |
|---|---|---|
| CN | 102226880 A | 10/2011 |
| CN | 102339125 A | 2/2012 |
| CN | 102402279 A | 4/2012 |
| CN | 102467237 A | 5/2012 |

OTHER PUBLICATIONS

Office Action issued in Chinese Patent Application No. 201210282552.7, dated Feb. 27, 2015.

International Search Report for International Application No. PCT/CN2013/079527, dated Oct. 24, 2013.

* cited by examiner

METHOD FOR OPERATING TERMINAL DEVICE WITH GESTURE AND DEVICE

CROSS-REFERENCE TO RELATED APPLICATIONS

This application is a continuation of International Application No. PCT/CN2013/079527, filed on Jul. 17, 2013, which claims priority to Chinese patent application No. 201210282552.7, filed on Aug. 9, 2012, the entire contents of which are incorporated herein by reference in their entireties.

FIELD OF THE INVENTION

The present application relates to a computer technical field, and more particularly, to a method for operating a terminal device with gesture and a device.

BACKGROUND

At present, a user generally operates a computer via a keyboard, mouse clicking or dragging. The user may input instructions with the keyboard or use shortcuts on the keyboard. Designated operations may be implemented via the mouse clicking or dragging. Along with development of the computer technology and diversity of users' requirements, all operation methods in the prior art require that the user may operate the computer with peripheral devices, such as the mouse and keyboard. Therefore, the conventional operation methods highly depend on the peripheral devices, such as the mouse and the keyboard.

SUMMARY

In order to solve the above technical problem, examples of the present disclosure disclose a method for operating a terminal device with gesture and a device. The technical scheme is as follows.

A method for operating a terminal device with gesture includes:

obtaining a gesture video segment including a preset number of frames of images;

obtaining gesture track information of a user according to a location of a finger of the user in each frame of image of the gesture video segment;

searching in a preset corresponding relationship between the gesture track information and an operation according to the gesture track information;

obtaining the operation corresponding to the gesture track information of the user; and performing the operation.

The method for obtaining the gesture video segment including the preset number of frames of images includes:

obtaining a video stream via a video device;

converting a format of the video stream; and obtaining the gesture video segment of a preset format;

wherein the gesture video segment includes the preset number of frames of images.

Before obtaining the gesture track information of the user according to the location of the finger of the user in each frame of image of the gesture video segment, the method further includes:

dividing each frame of image in the gesture video segment into multiple location areas;

wherein each area includes same number of pixels.

The method for obtaining the gesture track information of the user according to the location of the finger of the user in each frame of image of the gesture video segment includes:

obtaining a location parameter of the finger of the user in each frame of image of the gesture video segment according to the location of the finger of the user in each frame of image of the gesture video segment; and obtaining the gesture track information of the user according to the location parameter of the finger of the user in each frame of image of the gesture video segment.

The method for obtaining the gesture track information of the user according to the location of the finger of the user in each frame of image of the gesture video segment includes:

taking a location parameter of the finger of the user in the first frame of image as a starting point;

taking a changed location parameter of the finger of the user as a waypoint; and taking a location parameter which does not change in a period of time as an ending point.

The gesture track information is a characteristic value denoting a moving track of the finger of the user and/or a moving direction of the finger of the user.

A device includes: a storage and a processor;

wherein the storage is to store a corresponding relationship between gesture track information and an operation;

the processor is to obtain a gesture video segment including a preset number of frames of images;

obtain gesture track information of a user according to a location of a finger of the user in each frame of image of the gesture video segment;

search in the corresponding relationship in the storage according to the gesture track information of the user;

obtain the operation corresponding to the gesture track information of the user; and perform the operation.

The processor is further to obtain a video stream via a video device;

convert a format of the video stream; and obtain the gesture video segment of a preset format;

wherein the gesture video segment includes the preset number of frames of images.

The processor is further to divide each frame of image in the gesture video segment into multiple location areas;

wherein each area includes same number of pixels.

The processor is further to obtain a location parameter of the finger of the user in each frame of image of the gesture video segment according to the location of the finger of the user in each frame of image of the gesture video segment; and obtain the gesture track information of the user according to the location parameter of the finger of the user in each frame of image of the gesture video segment.

The processor is further to take a location parameter of the finger of the user in the first frame of image as a starting point;

take a changed location parameter of the finger of the user as a waypoint; and take a location parameter which does not change in a period of time as an ending point.

The gesture track information is a characteristic value denoting a moving track of the finger of the user and/or a moving direction of the finger of the user.

This example of the present disclosure provides a method for operating a terminal device with gesture and a device. The gesture video segment is obtained. The gesture video segment includes a preset number of frames of images. The gesture track information of the user is obtained according to a location of a finger of the user in each frame of image of the gesture video segment. The preset corresponding relationship between gesture track information and an operation is searched for an operation according to the gesture track information of the user. The operation corresponding to the gesture track information of the user is obtained and the corresponding operation is performed. With the technical scheme of the present disclosure, the gesture track information of the user is obtained via analyzing each frame of image in the obtained gesture video segment. The gesture track information of the user in a dimensional plane is concerned and the corresponding operation thereof is obtained via the gesture track information. This technical scheme may enrich the methods for triggering the operation, operate the terminal device without directly touching the terminal device and reduce the dependence on the peripheral devices, such as the mouse and the keyboard.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

The present invention is further described in detail hereinafter with reference to the accompanying drawings to make the objective, technical solution and merits thereof more apparent.

Figures 1, 2:
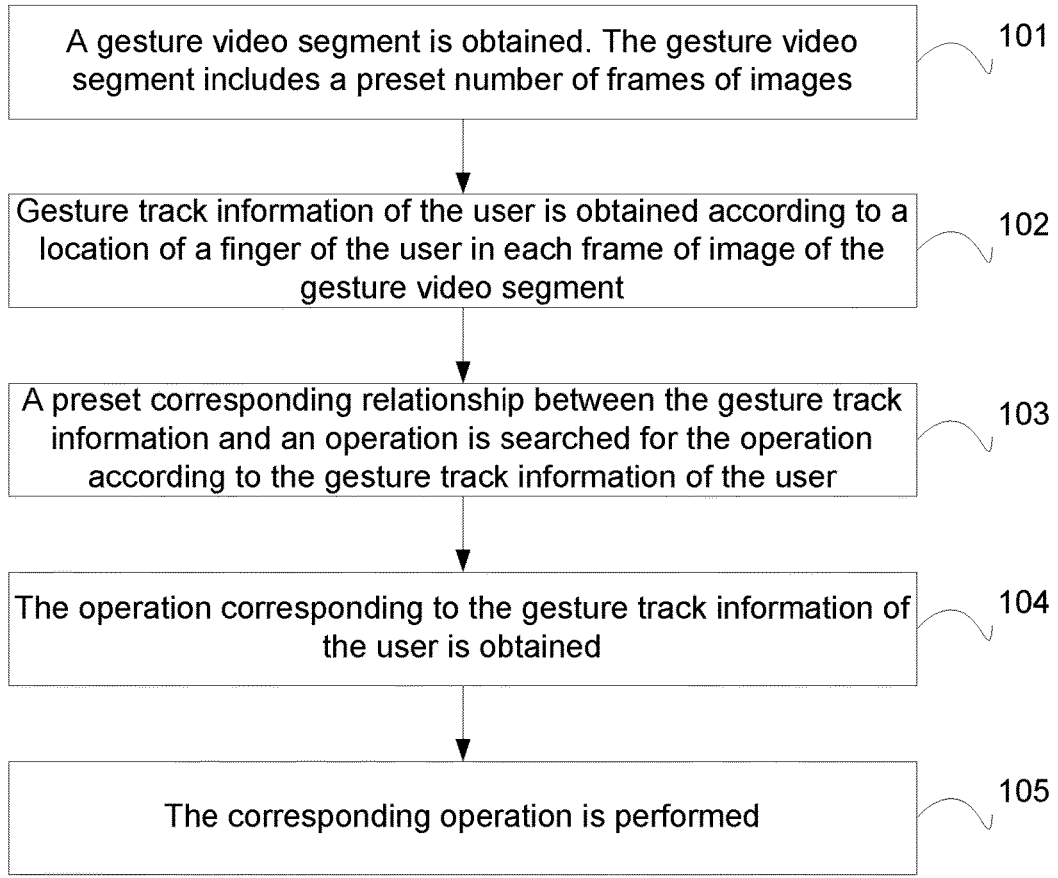
FIG. 1 is a flow chart illustrating a method for operating a terminal device with gesture in accordance with an example of the present disclosure.
FIG. 2 is a schematic diagram illustrating areas of an image in accordance with an example of the present disclosure.

FIG. 1 is a flow chart illustrating a method for operating a terminal device with gesture in accordance with an example of the present disclosure. This embodiment is implemented by a terminal device. The terminal device may be a fixed terminal device or a mobile terminal device. The fixed terminal device may be a Personal Computer (PC). The mobile terminal device may be a smart phone, a Tablet Personal Computer (PC), a Moving Picture Experts Group Audio Layer III (MP3) and a Personal Digital Assistant (PDA), etc.

Referring to FIG. 1, the example includes the following blocks.

In block 101, a gesture video segment is obtained. The gesture video segment includes a preset number of frames of images.

A format of the gesture video segment is N frames each second. This example of the present disclosure does not make limitation on specific length of the gesture video segment. That is, the preset value is multiple of N. N is a positive integer larger than or equal to one.

The example is described taking the processing of a video segment in a video stream obtained by a video device for example. As for all the video segments in the video stream, the same processing is performed on each video segment in a chronological order of the video segments.

In block 102, gesture track information of the user is obtained according to a location of a finger of the user in each frame of image of the gesture video segment.

As for the terminal device, the location of the finger of the user in the image is determined according to the color of an area block and shape of a blurred image. In this embodiment, the location of the finger of the user refers to the location of the center of the finger of the user.

The gesture track information may include a characteristic value denoting a moving track of the finger of the user and/or a moving direction of the finger of the user. A track is obtained via the moving track of the finger of the user and/or the moving direction of the finger of the user and the gesture track information corresponding to the track is obtained according to the track and a preset algorithm (a characteristic value algorithm, such as a MD5 algorithm).

In block 103, a preset corresponding relationship between the gesture track information and an operation is searched for the operation according to the gesture track information of the user.

The corresponding relationship between the gesture track information of the operation is preset on the terminal device. The corresponding relationship between the gesture track information and the operation may be saved in a gesture track information database. Each piece of the gesture track information corresponds to an operation. If the corresponding relationship includes the gesture track information of the user, it denotes that the corresponding relationship includes the operation corresponding to the gesture track information.

It should be noted that the preset corresponding relationship between the gesture tracking information and the operation may apply to all applications on the terminal device. That is, the corresponding relationship between the gesture track information and the operation applies to all the applications on the terminal device. The operation may be obtained via the preset corresponding relationship between the gesture track information and the operation when the user logs on any application. The preset corresponding relationship between the gesture track information and the operation may apply only to a specific application. The stored operations are the operations of the application. Only the application may obtain the operation according to the preset corresponding relationship between the gesture track information and the operation. This example of the preset disclosure does not make limitation on this.

In block 104, the operation corresponding to the gesture track information of the user is obtained.

The corresponding relationship is searched for the corresponding operation taking the gesture track information of the terminal device as an index and the corresponding operation is obtained when the corresponding operation is found.

The operation in this example may be the operation performed on a corresponding application, such as exiting the application, enlarging the interface of the application. The operations may be an operation performed on a page displayed by the terminal device, such as enlarging or reducing the page. The example of the present disclosure does not make limitation on the operation.

It should be noted that the gesture track information may be divided into many types. Corresponding operations may be found from the corresponding relationship with some gesture track information, while no operation may be found from the corresponding relationship with same gesture track information. No response is made to gesture track information which does not correspond to any operation.

In block 105, the corresponding operation is performed.

In this example, when the corresponding operation is obtained, the operation is performed. The current page may be controlled without directly touching the terminal device, which may reduce the dependence on the keyboard. For instance, if the obtained operation is scrolling up the current page to the previous page, the terminal device sends a message functioning as a PageDown keyboard message in Windows to scroll the page on the screen.

This example of the present disclosure provides a method for operating a terminal device with gesture. The gesture video segment is obtained. The gesture video segment includes a preset number of frames of images. The gesture track information of the user is obtained according to a location of a finger of the user in each frame of image of the gesture video segment. The preset corresponding relationship between gesture track information and an operation is searched for an operation according to the gesture track information of the user. The operation corresponding to the gesture track information of the user is obtained and the corresponding operation is performed. With the technical scheme of the present disclosure, the gesture track information of the user is obtained via analyzing each frame of image of the obtained gesture video segment. The gesture track information of the user in a dimensional plane is concerned and the corresponding operation thereof is obtained via the gesture track information. This technical scheme may enrich the methods for triggering the operation, operate the terminal device without directly touching the terminal device and reduce the dependence on the peripheral devices, such as the mouse and the keyboard.

Optionally, based on the technical scheme of the example shown in FIG. 1, the method for obtaining the gesture video segment in block 101 includes block 101*a*.

In block 101*a*, the video stream is obtained via a video device. The format of the video stream is converted to obtain the gesture video segment of the preset format. The gesture video segment includes the preset number of frames of image.

The preset format is set by technical personnel or a user according to his/her habit, by which the format of the video stream output by the video device is configured as N frames each second. The format may be configured as 30 frames each second.

For instance, an example, in which the format of the video is configured via a DirectShow interface in DirectX SDK is given.

if(!capSetVideoFormat(m_hWndCapture,&m_InInfo,sizeof(BITMAPINFO)))

AfxMessageBox("Fail to set the video format"); // the format of the video is configured capPreviewRate(m_hWndCapture, 30); // the rate for previewing the frames is 30 Fps (30 frames each second)

capPreview(this→m_hWndCapture,TRUE); // may preview

With the above codes, the format of the video is configured as 30 frames each second. The format of the output video stream is 30 frames each second.

In this example, each video segment in the video stream may be processed in a chronological order. When the previous video segment is processed, the next video segment is obtained. In this example, the processing of one video segment is described hereinafter in detail.

Optionally, based on the technical scheme in the example shown in FIG. 1, before obtaining the gesture track information of the user according to the location of the finger of the user in each frame of image of the gesture video segment in block 102, the method includes: dividing each frame of the image in the gesture video segment into multiple location areas. The number of pixels in each area is the same.

In practice, the finger of the user may generate slight movement. Actually, the slight movement is not used for performing a certain operation. Therefore, the present disclosure needs to reduce the effect of the slight movement in the video processing and accurately determine whether the finger of the user moves. In this example, each frame of image in the video segment is roughly divided. That is, the image is divided into multiple areas. The number of the pixels in each area is the same.

This example of the present disclosure provides a method for operating a terminal device with gesture. The gesture video segment is obtained. The gesture video segment includes the preset number of frames of images. The gesture track information of the user is obtained according to the location of the finger of the user in each frame of image of the gesture video segment. The preset corresponding relationship between gesture track information and an operation is searched for an operation according to the gesture track information of the user. The operation corresponding to the gesture track information of the user is obtained and the corresponding operation is performed. With the technical scheme of the present disclosure, the gesture track information of the user is obtained via analyzing each frame of image in the obtained gesture video segment. The gesture track information of the user in a dimensional plane is concerned and the corresponding operation thereof is obtained via the gesture track information. This technical scheme may enrich the methods for triggering the operation, operate the terminal device without directly touching the terminal device and reduce the dependence on the peripheral devices, such as the mouse and the keyboard. Furthermore, the movement of the finger of the user may be roughly estimated via dividing the granularity of the image areas. The gesture track of the finger of the user may be accurately obtained via comparing the images frame by frame.

Optionally, based on the technical scheme in the example shown in FIG. 1, the method for obtaining the gesture track information of the user according to the location of the finger of the user in each frame of image of the gesture video segment in block 102 includes the following blocks.

In block 102a, a location parameter of the finger of the user in each frame of image of the gesture video segment is obtained according to the location of the finger of the user in each frame of image of the gesture video segment.

Specifically, as for each frame of image of the gesture video segment, the location parameter of the finger of the user in each frame of image is determined according to the color of an area block and shape of a blurred image.

Furthermore, an area coordinate of the area, at which the finger of the user locates, in the image is taken as the location parameter of the finger of the user in the image.

If each frame of image in the gesture video segment is divided into multiple location areas, each area has a corresponding area coordinate. An area coordinate of an area is determined by the location of the area in the areas. If the area is in second line and second column of the areas, the area coordinate of the area is (2, 2).

Specifically, as for each frame of image, resolution of each frame of obtained image is formatted into preset pixels, such as 640*480 (i.e., there are 640 pixel points in the horizontal direction and 480 pixel points in the longitudinal direction). The image is divided into M*M corresponding areas, such as 16*16 corresponding areas (each area has 160*120 pixel points). There are two methods for denoting the location parameter of each point in the image. One method is based on a pixel coordinate and the other is based on the area coordinate. For instance, FIG. 2 is a schematic diagram illustrating areas of an image in accordance with an example of the present disclosure. As shown in FIG. 2, the image is divided into 4*4 corresponding areas. The coordinate of A in the second line and second column is determined as that the coordinate of the pixel points of A is (200,150) and the area coordinate of A is (1, 1).

As for the finger of the user, since the image is divided into areas, the location parameter may be denoted by the area coordinate of the area, at which the finger of the user locates. Since the granularity of the division is different, there are two scenarios. First, the actual locations of the finger of the user in the multiple frames of images of the gesture video segment are changed, while the area, at which the finger locates, does not change and the location parameter does not change. Second, the actual locations of the finger of the user in the multiple frames of images of the gesture video segment change, the area, at which the finger locates, changes and the location parameters also change. As for the first scenario, a conclusion that the finger of the user does not move is obtained via the determination performed in block 102b. As for the second scenario, a conclusion that the finger of the user moves is obtained via the determination in the block 102b.

In block 102a, a single-frame image in the video segment is obtained via a callback function FrameCallBack( ).
if(!capSetCallbackOnFrame(this→m_hWndCapture,FrameCallBack)) // set a single-frame callback function
AfxMessageBox("fail to setCallbackOnFrame function");

In block 102b, the gesture track information of the user is obtained according to the location parameter of the finger of the user in each frame of image of the gesture video segment.

Specifically, the gesture track of the user is obtained according to the location parameter of the finger of the user in each frame of image of the gesture video segment. After the gesture track of the user is obtained, the gesture track information of the user is obtained according to the gesture track of the user and a preset algorithm. The method for obtaining the gesture track of the user according to the location parameter of the finger of the user in each frame of the gesture video segment includes: taking the location parameter of the finger of the user in the first frame of image as a starting point, taking the changed location parameter of the finger of the user as a waypoint by comparing each frame and taking the location parameter of the finger of the user which does not change in a certain period as an ending point. Therefore, the gesture track information in the gesture video segment is obtained.

In this example, if the location parameters of the finger of the user in consecutive preset number of frames of the gesture video segment do not change, a conclusion that the finger of the user does not move is obtained. If the location parameters of the finger of the user in the consecutive preset number of frames of the gesture video segment change, a conclusion that the finger of the user moves is obtained. If the location parameter of the finger of the user in the current frame of image is different from that of the finger of the user in the previous frame of image, the conclusion that the finger of the user moves is obtained and the location parameter of the finger of the user in the first frame of image is taken as the starting point. If determining that the location parameter of the finger of the user changes by comparing each frame of image, the changed location parameter is taken as the waypoint. If the location parameter of the finger of the user does not change, the location parameter of the finger of the user in the last frame of image of the gesture video segment is taken as the ending point. Therefore, the gesture track of the finger of the user in the gesture video segment is obtained. If determining that the finger of the user in the gesture video segment does not move according to the location parameter of the finger of the user in each frame of image of the gesture video segment, the processing of the current gesture video segment is terminated. As for the example in block 102c, that is, the location parameters of the finger of the user in consecutive 30 frames of images do not change, the conclusion that the finger of the user in the gesture video segment does not change is obtained and the processing of the current gesture video segment is terminated.

This example is described taking the processing of one video segment in the video stream for example and the processing of other obtained video segments in the video stream is the same as that in this example, which is not repeated.

For example, suppose that the gesture video segment includes 30 frames of images, the location parameter of the finger in the first frame of image is (3, 1), the location parameter of the finger in the second frame of image is (3, 1) and location parameter of the finger in the third frame of image is (2, 1). That is, compared with the location parameter of the finger in the second frame of image, the location parameter of the finger in the third frame of image changes. The location parameter (3, 1) of the finger in the first frame of image is taken as the starting point and the location parameter (2, 1) of the finger in the third frame of image is taken as the waypoint. The location parameter of the finger in the fourth frame of image is (2, 2). All location parameters in the consecutive 26 frames of images are (2, 2), denoting that the location parameters of the finger of the user in the fourth frame of image to the 26th frame of image do not change. The location parameter (2, 2) of the last frame of image is taken as the ending point. The obtained gesture track of the user is (3, 1)→(2, 1)→(2, 2) (i.e. from (3, 1) to (2, 2) via (2, 1)).

Figure 3:
FIG. 3 is a schematic diagram illustrating a gesture track in accordance with an example of the present disclosure.

For another example, FIG. 3 is a schematic diagram illustrating a gesture track in accordance with an example of the present disclosure. Referring to FIG. 3, the gesture track of the finger of the user is a line sliding to the right. The current gesture track of the user of the terminal device is the line sliding to the right.

The preset algorithm is a default algorithm of the terminal device or an algorithm configured by the user of the terminal device. As for each gesture track, the gesture track information uniquely corresponding to the gesture track is obtained after calculating each gesture track with the preset algorithm. Each piece of gesture track information is different.

Furthermore, as for the gesture tracks with the same shape and different directions, the same gesture track information or different gesture track information may be obtained according to different preset algorithms. If the direction is used in a preset algorithm to affect the result, as for the gesture tracks with the same shape and different directions, different gesture track information may be obtained using the preset algorithm. If the direction is not used in another preset algorithm to affect the result, i.e. only the shape is used in the algorithm to affect the result, as for the gesture tracks with the same shape and different directions, the same gesture track information may be obtained with the another preset algorithm.

Figure 4:
FIG. 4 is a schematic diagram illustrating another gesture track in accordance with an example of the present disclosure.

For an example, FIG. 4 is a schematic diagram illustrating another gesture track in accordance with an example of the present disclosure. Referring to FIG. 4, the gesture track of the finger of the user is a line sliding to downward. The current gesture track of the user of the terminal device is the line sliding to downward. With the preset algorithm, the gesture track information corresponding to the current gesture track of the user of the terminal device in FIG. 3 is A, while the gesture track information corresponding to the current gesture track of the user of the terminal device in FIG. 4 is B. However, A is not equal to B.

Furthermore, based on the technical scheme of the example shown in FIG. 1, the method for obtaining the gesture track information of the user according to the location parameter of the finger of the user in each frame of image of the gesture video segment in block 102b of the above example includes: determining whether the location parameter of the finger of the user changes according to the location parameter of the finger of the user in each frame of image of the gesture video segment and obtaining the gesture track information of the user when the location parameter of the finger of the user changes. The method for determining whether the location parameter of the finger of the user changes according to the location parameter of the finger of the user in each frame of image of the gesture video segment includes:

Step one: determining whether the location parameter of the finger of the user in the (i−1)th frame of image of the gesture video segment is the same as that of the finger of the user in the ith frame of image;

Step two: determining that the location parameter of the finger of the user changes if the location parameter of the finger of the user in the (i−1)th frame of image differs from that of the finger of the user in the ith frame of image;

Step three: determining that the location parameter of the finger of the user does not change if the location parameter of the finger of the user in each frame of image of the gesture video segment is the same. Wherein, i is a positive integer less than the preset number.

As for each frame of image in the gesture video segment, the location parameter of the finger of the user in the current frame of image is obtained and the location parameter of the finger of the user in the next frame of image is obtained. The two location parameters are compared, if the location parameter of the finger of the user in the current frame of image is different from that of the finger of the user in the next frame of image, the conclusion that the location parameter of the finger of the user changes is obtained. The location parameter of the finger of the user in the next frame of image is taken as the waypoint. If the location parameter of the finger of the user in the current frame of image is the same as that of the finger of the user in the next frame of image, the conclusion that the location parameter of the finger of the user does not change is obtained.

The images in this example are determined frame by frame. In another example, the images may not be determined frame by frame, but determined every two frames. That is, the location parameter of the finger of the user in the (i−2)th frame of image and the location parameter of the finger of the user in the ith frame image are compared to determine whether the location parameter of the finger of the user changes.

Furthermore, based on the technical scheme in the example shown in FIG. 1, the method for determining that the location parameter of the finger of the user changes if the location parameter of the finger of the user in the (i−1)th frame of image and the location parameter of the finger of the user in the ith frame of image are different in step two of the above example includes: determining that the location parameter of the finger of the user changes if the location parameter of the finger of the user in the (i−1)th frame of image and the location parameter of the finger of the user in the ith frame of image are different and the finger of the user in the ith frame of image is in the scope of the ith frame of image. When the finger of the user moves out of the collection scope of the camera, i.e. the location parameter of the finger of the user may not be determined, the location parameter of the finger of the user in the (i−1)th frame of image and the location parameter of the finger of the user in the ith frame of image are different. However, in this situation, the movement of the finger of the user is invalid. Therefore, only when the finger of the user is in the scope of the ith frame of image, the movement of the finger of the user is valid, i.e., the location parameter of the finger of the user changes.

Optionally, based on the example shown in FIG. 1, there are two blocks, i.e. block 100a and block 100b before obtaining the gesture track information of the user of the terminal device in block 101.

In block 100a, a corresponding relationship between each piece of gesture track information and an operation is established.

In this example, the gesture track information and the operation is associated in advance, so that the corresponding operation may be obtained via this piece of gesture track information when the gesture track information is received.

In block 100b, the corresponding relationship is saved.

It should be noted that the corresponding relationship may be saved in a gesture track information database. Each piece of gesture track information uniquely corresponds to an operation. If the corresponding relationship includes the current gesture track information of the user of the terminal device, a conclusion that the corresponding relationship includes the operation corresponding to the gesture track information is obtained.

Furthermore, based on the above example, the method for establishing the corresponding relationship between each piece of gesture track information and the operation includes steps (a), (b), (c) and (d).

In step (a), a first operation is received.

The first operation in this example may be any operation and may be configured by technical personnel or a user according to his/her habits. Furthermore, this example is described taking establishing the corresponding relationship between the first operation and the first gesture track information for example. In practice, the corresponding relationship between the gesture track information and the operation may include multiple pieces of gesture track information and the operation corresponding to each piece of gesture track information. This example of the present disclosure does not limit the time for establishing the corresponding relationship between the gesture track information and the corresponding operation.

In step (b), the first gesture track information is obtained.

The process for obtaining the first track information is the same as that in block 101, which is not repeated here.

In step (a), the corresponding relationship between the preset gesture track information and the operation is searched according to the first gesture track information.

In order to guarantee the one-to-one correspondence between the gesture track information and the operation, the preset corresponding relationship between the gesture track information and the operation is searched to determine whether the first gesture track information is included. If the first gesture track information is included, a conclusion that the first gesture track information corresponds to an operation is obtained. The user needs to input another piece of gesture track information if yes; otherwise, a conclusion that the first gesture track information does not correspond to an operation and the first gesture track information is available.

In practice, when the first gesture track information corresponds to an operation and the user needs to input another piece of gesture track information, a user display interface gives a prompt to the user, so that the user may input another piece of gesture track information. While when the first gesture track information does not correspond to an operation and the first gesture track information is available, in order to guarantee correct input of the user, the user display interface prompts the user to input the first gesture track information again.

In step (d), when the preset corresponding relationship between the gesture track information and the operation does not include the first gesture track information and the first gesture track information is obtained again, the corresponding relationship between the first gesture track information and the first operation is established.

For instance, in the process of establishing the corresponding relationship, the terminal device records a triangle gesture track, i.e. the gesture track of the user, via processing the video segment and obtains the gesture track information corresponding to the triangle according to the present algorithm. If the gesture track information corresponding to the triangle has a corresponding operation (i.e. the user has established the corresponding relationship between the gesture track information corresponding to the triangle and the operation) via the searching process in step (c), the user is prompted to input another piece of gesture track information. The user performs gesture inputting again. The terminal device records a star gesture track, i.e. the gesture track of the user via processing the video segment, obtains the gesture track information corresponding to the star according to the present algorithm. If the gesture track information corresponding to the start does not correspond to an operation via the searching process in step (c), the user is prompted to input the gesture track information corresponding to the star again. When the gesture track information corresponding to the star is obtained again, the corresponding relationship between the gesture track information corresponding to the star and the first operation is established.

The above optional technical schemes may be combined with any method to form optional examples of the present disclosure, which is not described with examples.

Figure 5:
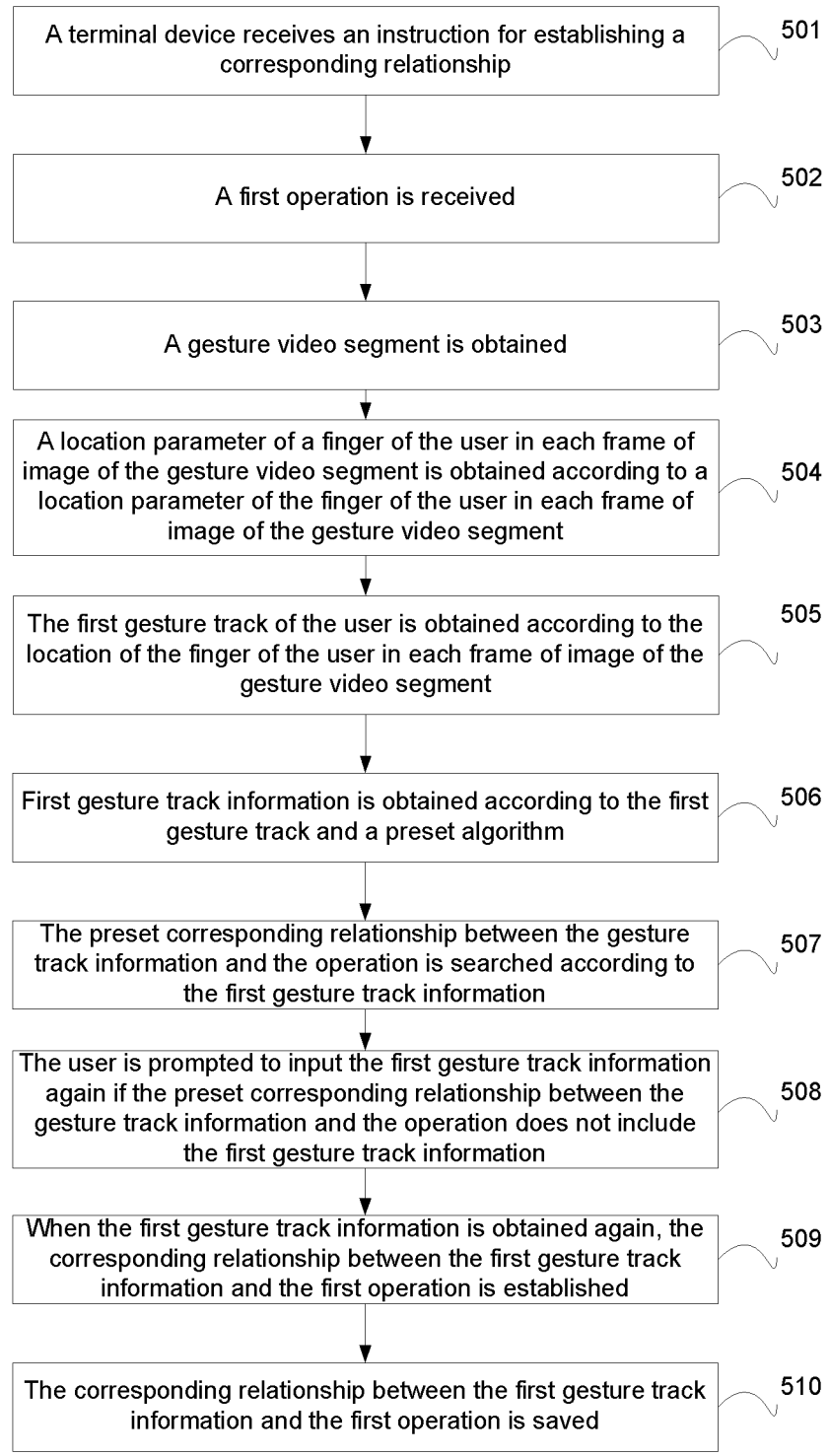
FIG. 5 is a flow chart illustrating a method for establishing a corresponding relationship between an operation and gesture track information in accordance with an example of the present disclosure.

FIG. 5 is a flow chart illustrating a method for establishing a corresponding relationship between an operation and gesture track information in accordance with an example of the present disclosure. This example describes the specific establishment flow accompanying with the above examples. Referring to FIG. 5, this example includes the following blocks.

In block 501, a terminal device receives an instruction for establishing a corresponding relationship.

The user triggers the establishment of the corresponding relationship. Therefore, when the user needs to establish the corresponding relationship between an operation and gesture track information, the user sends the instruction for establishing the corresponding relationship. After receiving the instruction for establishing the corresponding relationship, the terminal device executes subsequent blocks.

In block 502, a first operation is received.

It should be noted that the order of the block 502 and blocks 503 to 505 is not limited to that in this example. In this example, the operation is received first, and then the gesture track information is obtained. In practice, the gesture track information may be obtained first, and then the operation is received. The first operation may be a first operation description input or selected by the user.

In block 503, a gesture video segment is obtained.

In block 504, a location parameter of a finger of the user in each frame of image of the gesture video segment is obtained according to a location parameter of the finger of the user in each frame of image of the gesture video segment.

In block 505, the first gesture track of the user is obtained according to the location of the finger of the user in each frame of image of the gesture video segment.

In block 506, first gesture track information is obtained according to the first gesture track and a preset algorithm.

In block 507, the preset corresponding relationship between the gesture track information and the operation is searched according to the first gesture track information.

In block 508, the user is prompted to input the first gesture track information again if the preset corresponding relationship between the gesture track information and the operation does not include the first gesture track information.

Furthermore, if the preset corresponding relationship between the gesture track information and the operation includes the first gesture track information, the user is prompt to input another piece of gesture track information. When the second gesture track information is received, the preset corresponding relationship between the gesture track information and the operation is searched according to the second track information. If the preset corresponding relationship between the gesture track information and the operation does not include the second gesture track information, the subsequent blocks are performed. If the preset corresponding relationship between the gesture track information and the operation includes the second gesture track information, the user is prompted to input another piece of gesture track information. The user is not prompted to input until the input gesture track information is not included in the present corresponding relationship between the gesture track information and the operation or retry number equals to a preset threshold.

In block 509, when the first gesture track information is obtained again, the corresponding relationship between the first gesture track information and the first operation is established.

In block 510, the corresponding relationship between the first gesture track information and the first operation is saved.

Figure 6:
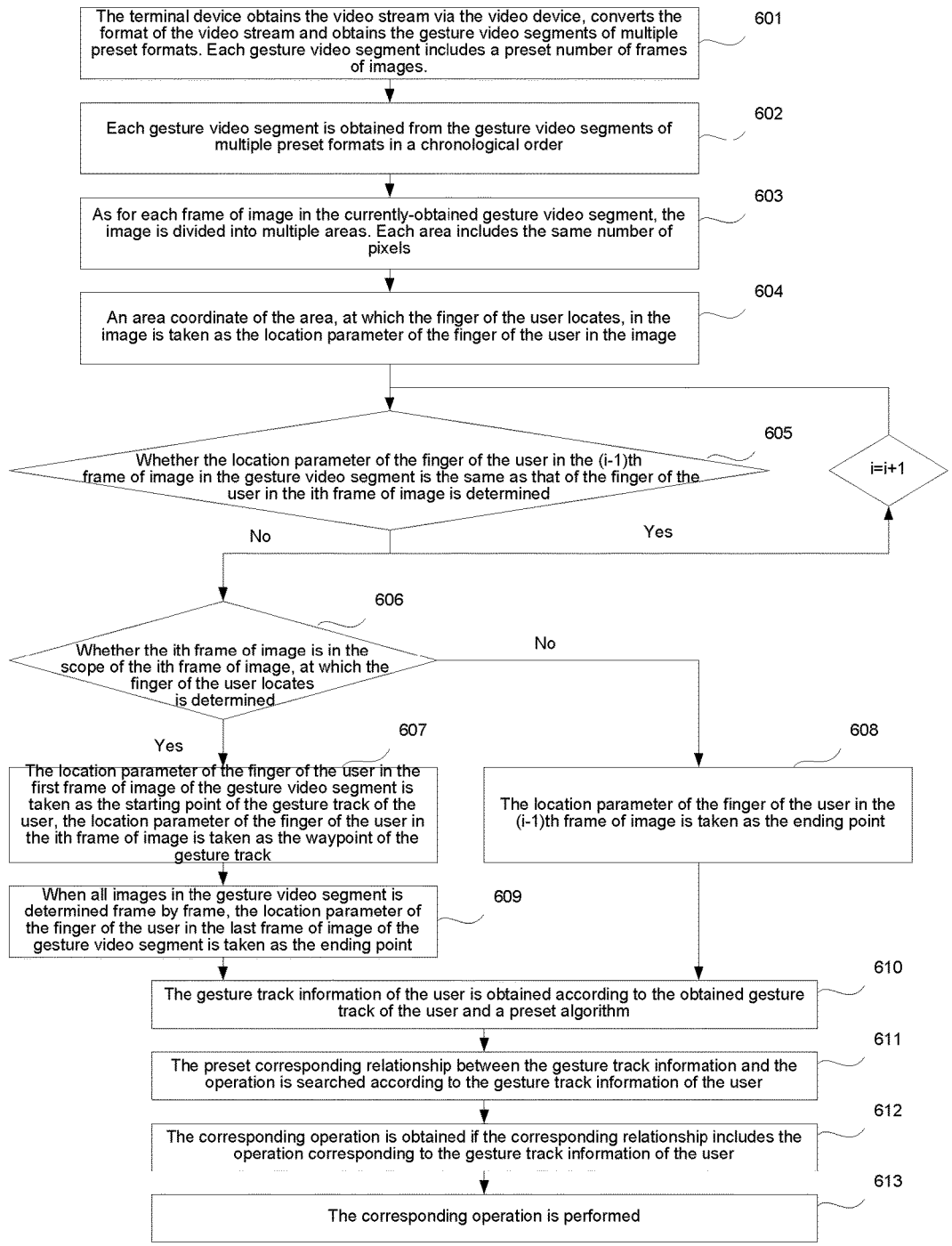
FIG. 6 is a flow chart illustrating another method for operating a terminal device with gesture in accordance with an example of the present disclosure.

The example shown in FIG. 5 describes the establishment of the corresponding relationship between the gesture track information and the operation taking the establishment of the corresponding relationship between the first gesture track information and the first operation. The operation method is further described taking the login scenario for example. FIG. 6 is a flow chart illustrating another method for operating a terminal device according to gesture in accordance with an example of the present disclosure. In the example shown in FIG. 5, the terminal device establishes and saves the preset corresponding relationship between the gesture track information and the operation with the establishment flow shown in FIG. 5. Accordingly, the example shown in FIG. 6 includes the following blocks.

In block 601, the terminal device obtains the video stream via the video device, converts the format of the video stream and obtains the gesture video segments of multiple preset formats. Each gesture video segment includes a preset number of frames of images. The number of the frames of the images is a preset value.

In block 602, each gesture video segment is obtained from the gesture video segments of multiple preset formats in a chronological order.

In block 603, as for each frame of image in the currently-obtained gesture video segment, the image is divided into multiple areas. Each area includes the same number of pixels.

In block 604, an area coordinate of the area, at which the finger of the user locates, in the image is taken as the location parameter of the finger of the user in the image.

In block 605, whether the location parameter of the finger of the user in the (i−1)th frame of image in the gesture video segment is the same as that of the finger of the user in the ith frame of image is determined. Block 606 is executed if yes; otherwise, the location parameter of the finger of the user in the (i+1)th frame of image is obtained. Whether the location parameter of the finger of the user in the ith frame of image in the gesture video segment is the same as that of the finger of the user in the (i+1)th frame of image is determined.

In block 606, whether the ith frame of image is in the scope of the ith frame of image, at which the finger of the user locates is determined. Block 607 is executed if yes; otherwise, block 608 is executed.

In block 607, the location parameter of the finger of the user in the first frame of image of the gesture video segment is taken as the starting point of the gesture track of the user, the location parameter of the finger of the user in the ith frame of image is taken as the waypoint of the gesture track of the user and block 609 is executed.

In block 608, the location parameter of the finger of the user in the (i−1)th frame of image is taken as the ending point and block 610 is executed.

In this block 608, if the finger of the user is not in the scope of the ith frame of image, a conclusion that the action of the finger of the user in the (i−1)th frame of image is finished is obtained. Therefore, the location parameter of the finger of the user in the (i−1) frame of image is taken as the ending point of the gesture track and the processing of the gesture video segment is terminated.

In block 609, when all images in the gesture video segment is determined frame by frame, the location parameter of the finger of the user in the last frame of image of the gesture video segment is taken as the ending point.

In this block 609, when all images in this gesture video segment are determined and the location parameter of the finger of the user changes, the gesture track of the finger of the user in the gesture video segment is obtained.

In block 610, the gesture track information of the user is obtained according to the obtained gesture track of the user and a preset algorithm.

In block 611, the preset corresponding relationship between the gesture track information and the operation is searched according to the gesture track information of the user.

In block 612, the corresponding operation is obtained if the corresponding relationship includes the operation corresponding to the gesture track information of the user.

In block 613, the corresponding operation is performed.

This example of the present disclosure provides a method for operating a terminal device with gesture. The gesture video segment is obtained. The gesture video segment includes the preset number of frames of images. The gesture track information of the user is obtained according to a location of a finger of the user in each frame of image of the gesture video segment. The preset corresponding relationship between gesture track information and an operation is searched for an operation according to the gesture track information of the user. The operation corresponding to the gesture track information of the user is obtained and the corresponding operation is performed. With the technical scheme of the present disclosure, the gesture track information of the user is obtained via analyzing each frame of image in the obtained gesture video segment. The gesture track information of the user in a dimensional plane is concerned and the corresponding operation thereof is obtained via the gesture track information. This technical scheme may enrich the methods for triggering the operation, operate the terminal device without directly touching the terminal device and reduce the dependence on the peripheral devices, such as the mouse and the keyboard.

Figure 7:
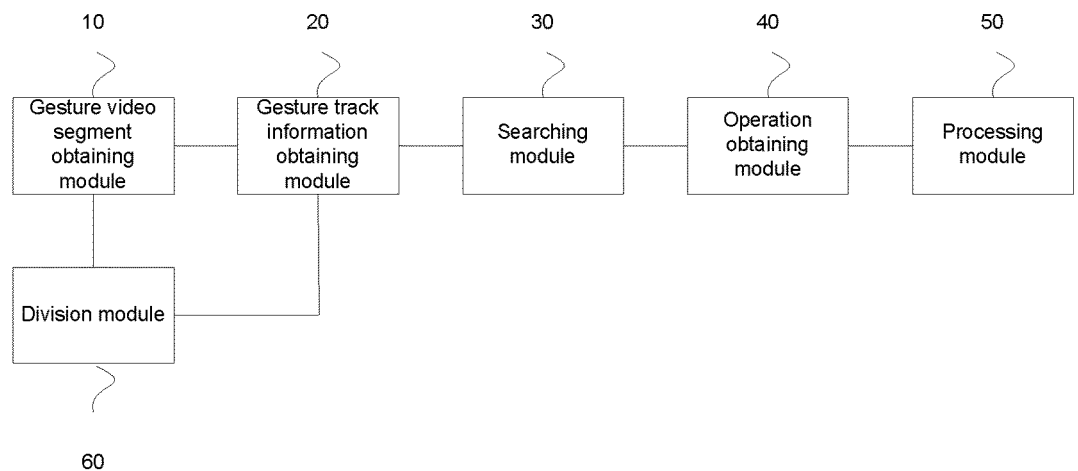
FIG. 7 is a schematic diagram illustrating structure of a device in accordance with an example of the present disclosure.

FIG. 7 is a schematic diagram illustrating structure of a device in accordance with an example of the present disclosure. Referring to FIG. 7, the device includes:

a gesture video segment obtaining module 10, to obtain a gesture video segment comprising a preset number of frames of images;

a gesture track information obtaining module 20, to obtain gesture track information of a user according to a location of a finger of the user in each frame of image of the gesture video segment;

a searching module 30, to search in a preset corresponding relationship between the gesture track information and the operation according to the gesture track information of the user;

an operation obtaining module 40, to obtain the operation corresponding to the gesture track information of the user; and a processing module 50, to perform the operation.

Optionally, the gesture video segment obtaining module 10 is to obtain a video stream via a video device, convert a format of the video stream and obtain the gesture video segment of a preset format.

The gesture video segment comprises the preset number of frames of images.

Optionally, the device further includes a division module 60, to divide each frame of image in the gesture video segment into multiple location areas.

Each area includes same number of pixels.

Optionally, the gesture track information obtaining module 20 includes: a location parameter obtaining unit, to obtain a location parameter of the finger of the user in each frame of image of the gesture video segment according to the location of the finger of the user in each frame of image of the gesture video segment; and a gesture track information obtaining unit, to obtain the gesture track information of the user according to the location parameter of the finger of the user in each frame of image of the gesture video segment.

Optionally, the gesture track information obtaining unit is further to take a location parameter of the finger of the user in the first frame of image as a starting point, take a changed location parameter of the finger of the user as a waypoint and take a location parameter which does not change in a period of time as an ending point. Therefore, the gesture track information of the user in the gesture video segment is obtained.

Optionally, the gesture track information is a characteristic value denoting a moving track of the finger of the user and/or a moving direction of the finger of the user.

The device for operating the terminal device with the gesture is described in the example shown in FIG. 7. The technical scheme of the present disclosure is described taking all the above optional examples for example. In practice, all the above optional technical schemes may form the optional technical schemes in the embodiments of the present disclosure with any combinable methods, which are not described here.

Figure 8:
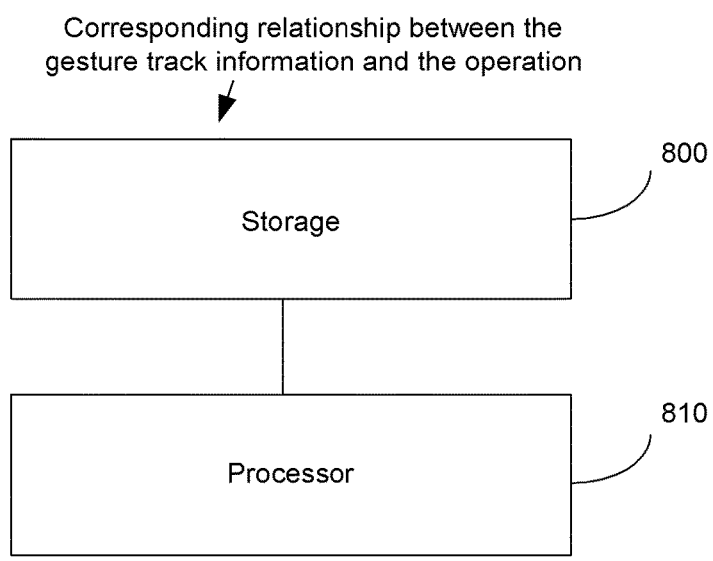
FIG. 8 is a schematic diagram illustrating structure of another device in accordance with an example of the present disclosure.

FIG. 8 is a schematic diagram illustrating structure of another device in accordance with an example of the present disclosure. As shown in FIG. 8, the device includes a storage 800 and a processor 810.

The storage 800 is to store a corresponding relationship between gesture track information and an operation.

The processor 810 is to obtain a gesture video segment comprising a preset number of frames of images, obtain gesture track information of a user according to a location of a finger of the user in each frame of image of the gesture video segment, search in the corresponding relationship in the storage 800 according to the gesture track information of the user, obtain the operation corresponding to the gesture track information of the user, and perform the operation.

The processor 810 is further to obtain a video stream via a video device, convert a format of the video stream and obtain the gesture video segment of a preset format. The gesture video segment comprises the preset number of frames of images.

The processor 810 is further to divide each frame of image in the gesture video segment into multiple location areas. Each area includes same number of pixels.

The processor 810 is further to obtain a location parameter of the finger of the user in each frame of image of the gesture video segment according to the location of the finger of the user in each frame of image of the gesture video segment and obtain the gesture track information of the user according to the location parameter of the finger of the user in each frame of image of the gesture video segment.

The processor 810 is further to take a location parameter of the finger of the user in the first frame of image as a starting point, take a changed location parameter of the finger of the user as a waypoint and take a location parameter which does not change in a period of time as an ending point.

The gesture track information is a characteristic value denoting a moving track of the finger of the user and/or a moving direction of the finger of the user.

The device in this example operates the terminal device with the above modules. The implementation scheme of the device is the same as that described in the relevant method examples. Referring to the above relevant method example for the detail detailed implementation scheme, the implementation scheme is not repeated here.

This example of the present disclosure provides a device for operating a terminal device with gesture. The gesture video segment is obtained. The gesture video segment includes a preset number of frames of images. The gesture track information of the user is obtained according to a location of a finger of the user in each frame of image of the gesture video segment. The preset corresponding relationship between gesture track information and an operation is searched for an operation according to the gesture track information of the user. The operation corresponding to the gesture track information of the user is obtained and the corresponding operation is performed. With the technical scheme of the present disclosure, the gesture track information of the user is obtained via analyzing each frame of image in the obtained gesture video segment. The gesture track information of the user in a dimensional plane is concerned and the corresponding operation thereof is obtained via the gesture track information. This technical scheme may enrich the methods for triggering the operation, operate the terminal device without directly touching the terminal device and reduce the dependence on the peripheral devices, such as the mouse and the keyboard.

It should be noted that the above example describes how to operate the terminal device with the gesture taking the above function modules for example. In practice, the above functions may be implemented by different function modules. That is, the device may be divided into different function modules, which finish all or partial of the above functions. Furthermore, the device in the above example has the same implementation scheme as that of the method examples. Referring to the above relevant method examples for the detail detailed implementation scheme, the implementation scheme is not repeated here.

It is well known to an ordinary skilled in the art the all or partial of the above examples may be implemented by hardware and may also be implemented by running programs on the hardware. The programs may be saved in a computer readable storage media. The above mentioned storage media may be a Read-only Memory (ROM), disk or CD-ROM.

The foregoing only describes preferred embodiments of the present invention. The protection scope of the present invention, however, is not limited to the above description. Any change or substitution, easily occurring to those skilled in the art, should be covered by the protection scope of the present invention.

What is claimed is:

1. A method for operating a terminal device with gesture, comprising:

obtaining a gesture video segment comprising a preset number of frames of images;

dividing each frame of image in the gesture video segment into multiple location areas; wherein each area comprises same number of pixels;

determining whether a finger of a user in each frame of the gesture video segment moves by determining whether actual locations of the finger of the user in each frame of the gesture video segment changes and whether a location area at which the finger is located is changed to another location area of the multiple location areas;

obtaining gesture track information of the user according to a location of the finger of the user in each frame of image of the gesture video segment when it is determined that actual locations of the finger of the user in each frame of the gesture video segment changes and the area, at which the finger locates, changes;

searching in a preset corresponding relationship between the gesture track information and an operation according to the gesture track information;

obtaining the operation corresponding to the gesture track information of the user; and performing the operation;

wherein obtaining the gesture video segment comprising the preset number of frames of images comprises: obtaining a video stream via a video device; converting a format of the video stream; and obtaining the gesture video segment of a preset format; wherein the gesture video segment comprises the preset number of frames of images;

wherein obtaining the gesture track information of the user according to the location of the finger of the user in each frame of image of the gesture video segment comprises: taking a location parameter of the finger of the user in a first frame of image as a starting point; taking a changed location parameter of the finger of the user as a waypoint; and taking a location parameter which does not change in a period of time as an ending point.

2. The method according to claim 1, wherein obtaining the gesture track information of the user according to the location of the finger of the user in each frame of image of the gesture video segment comprises:

obtaining a location parameter of the finger of the user in each frame of image of the gesture video segment according to the location of the finger of the user in each frame of image of the gesture video segment; and obtaining the gesture track information of the user according to the location parameter of the finger of the user in each frame of image of the gesture video segment.

3. The method according to claim 1, wherein the gesture track information is a characteristic value denoting at least one of a moving track of the finger of the user and a moving direction of the finger of the user.

4. A device, comprising: a storage and a processor;

wherein the storage is to store a corresponding relationship between gesture track information and an operation;

the processor is to obtain a gesture video segment comprising a preset number of frames of images;

divide each frame of image in the gesture video segment into multiple location areas; wherein each area comprises same number of pixels;

determine whether a finger of a user in each frame of the gesture video segment moves by determining whether actual locations of the finger of the user in each frame of the gesture video segment changes and whether a location area at which the finger is located is changed to another location area of the multiple location areas;

obtain gesture track information of the user according to a location of the finger of the user in each frame of image of the gesture video segment when it is determined that actual locations of the finger of the user in each frame of the gesture video segment changes and the area, at which the finger locates, changes;

search in the corresponding relationship in the storage according to the gesture track information of the user;

obtain the operation corresponding to the gesture track information of the user; and perform the operation;

the processor is further to obtain a video stream via a video device; convert a format of the video stream; and obtain the gesture video segment of a preset format;

wherein the gesture video segment comprises the preset number of frames of images;

the processor is further to take a location parameter of the finger of the user in a first frame of image as a starting point; take a changed location parameter of the finger of the user as a waypoint; and take a location parameter which does not change in a period of time as an ending point.

5. The device according to claim 4, wherein the processor is further to obtain a location parameter of the finger of the user in each frame of image of the gesture video segment according to the location of the finger of the user in each frame of image of the gesture video segment; and obtain the gesture track information of the user according to the location parameter of the finger of the user in each frame of image of the gesture video segment.

6. The device according to claim 4, wherein the gesture track information is a characteristic value denoting at least one of a moving track of the finger of the user and a moving direction of the finger of the user.

* * * * *